United States Patent [19]

Becker et al.

[11] Patent Number: 4,551,157

[45] Date of Patent: Nov. 5, 1985

[54] METHOD FOR SEPARATING LIGHT ADDITIVE GAS IN SEPARATING NOZZLE CASCADES

[75] Inventors: Erwin Becker; Wolfgang Ehrfeld; Wolfgang Fritz, all of Karlsruhe; Harald Steinhaus, Datteln; Peter Bley, Eggenstein-Leopoldshafen, all of Fed. Rep. of Germany

[73] Assignee: Kernforschungszentrum Karlsruhe GmbH, Karlsruhe, Fed. Rep. of Germany

[21] Appl. No.: 470,287

[22] Filed: Feb. 28, 1983

[30] Foreign Application Priority Data

Feb. 26, 1982 [DE] Fed. Rep. of Germany ....... 3206821

[51] Int. Cl.⁴ ............................................. B01D 59/18
[52] U.S. Cl. ........................................... 55/17; 55/66; 55/71
[58] Field of Search ....................... 55/17, 66, 71, 277, 55/392; 137/814, 833; 204/9

[56] References Cited

U.S. PATENT DOCUMENTS

| 1,700,928 | 2/1929 | Fawkes | 55/17 X |
| 2,951,554 | 9/1960 | Becker | 55/17 |
| 3,320,722 | 5/1967 | Lucas | 55/17 |
| 3,362,131 | 3/1968 | Becker et al. | 55/17 |
| 3,877,892 | 4/1975 | Bley et al. | 55/17 |
| 3,989,483 | 11/1976 | Becker et al. | 55/17 |
| 4,113,448 | 9/1978 | Haarhoff et al. | 55/17 |
| 4,181,508 | 1/1980 | Schmid et al. | 55/82 |
| 4,246,007 | 1/1981 | Becker et al. | 55/17 |
| 4,344,782 | 8/1982 | Groszstuck | 55/17 X |
| 4,356,005 | 10/1982 | Schumann | 55/71 X |

FOREIGN PATENT DOCUMENTS

| 1198328 | 8/1965 | Fed. Rep. of Germany . |
| 2654249 | 6/1978 | Fed. Rep. of Germany . |
| 2243730 | 5/1979 | Fed. Rep. of Germany . |
| 2922642 | 10/1981 | Fed. Rep. of Germany . |

OTHER PUBLICATIONS

KFK Report 1437, Kernforschungszentrum Karlsruhe, Jul. 1971, H. J. Fritsch, R. Schütte, "Trennung von UF6 und Zusatzgas bei Trenndüsenanlagen mit einer Kombination von Vorabscheidungs–Trenndüse und Tieftemperatur–Feinabscheidung".

KFK Report 3196, Kernforschungszentrum Karlsruhe, Jul. 1981, P. Hornberger, D. Seidel, H. Steinhaus, "Erprobung eines technischen Gegenstrom-Kompaktwärmetauschers für die Trennung von Uranhexafluorid und Wasserstoff".

"Zeitschrift fur Naturforschung", Europhysics Journal, Banc 32a, 1977, pp. 401 to 410.

Primary Examiner—Robert Spitzer
Attorney, Agent, or Firm—Sughrue, Mion, Zinn, Macpeak and Seas

[57] ABSTRACT

A process for the separation of light additive gas at the end of and/or at the location of the change in stage sizes in a separating nozzle cascade which is operated with a mixture of gaseous or vaporous substances to be separated. The separation of the light additive gas is effected by using a separating nozzle stage. A double deflection separating nozzle is employed as the separating nozzle stage.

10 Claims, 7 Drawing Figures

METHOD FOR SEPARATING LIGHT ADDITIVE GAS IN SEPARATING NOZZLE CASCADES

BACKGROUND OF THE INVENTION

The present invention relates to a method for separating light additive gas at the end of a separating nozzle cascade and/or at the location of the change in stage size in a separating nozzle cascade, the separating nozzle cascade operating with a mixture of gaseous or vaporous substances to be separated and a light additive gas.

In separating nozzle processes for the separation of gaseous or vaporous mixtures, particularly isotope mixtures, a light additive gas is used in molar excess so as to improve the economy of the process. In this type of arrangement, the separating nozzle process has gained special significance in connection with the enrichment of the light uranium isotope $^{235}U$ for nuclear reactors. The mixture to be separated then comprises the isotope molecules $^{235}UF_6$ and $^{238}UF_6$, while the light additive gas is usually hydrogen or helium. To simplify matters, the process according to the present invention will be explained below for such an example in which hydrogen ($H_2$) is assumed to be the light additive gas. The process, however, can also be used with technical and economical success for other substance mixtures to be separated and other light additive gases.

In order to realize the $^{235}U$ concentration of about 3.2% required for light water nuclear power plants, several hundred separating nozzle stages, with each stage generally including a separating nozzle and a compressor, must be connected in series in a so-called isotope separating cascade. In the best cascade connection for isotope separation, the undesirable demixing of $UF_6$ and $H_2$ which occurs along the isotope separating cascade is automatically reversed when the various partial streams are combined. However, at the head of the isotope separating cascade and at points where stage sizes change in the cascade, there appears an extra stream of hydrogen which contains $UF_6$ and which must there be separated in a so-called $UF_6$ separation system and returned to the isotope separating cascade at suitable locations. Since the mixing ratios of the uranium isotopes differ greatly at the separation and input locations, the recycled hydrogen must contain practically no $UF_6$. In an industrial system, a residual content of a few ppm $UF_6$ can already cause a production loss of enriched uranium in the order of magnitude of several percent.

The separation of $UF_6$ and $H_2$ in a $UF_6$ separation system in the form of a gas separating cascade comprising 8 to 10 separating nozzle stages has been tried and found to be too expensive, as reported in KfK Report 1437, Kernforschungszentrum Karlsruhe, July, 1971. Accordingly, a combination of only one separating nozzle stage for preliminary separation (preliminary separation stage) and a system of switchable low temperature countercurrent separators (low temperature separators) has been provided as a $UF_6$ separation system. Clogging of the low temperature separators by frozen, solid $UF_6$ is to be prevented in this system by a computer controlled supply of coolant. See German Patent No. 2,654,249.2 and corresponding U.S. Pat. No. 4,181,508. In a more recent publication, the coolant input is controlled automatically by means of the pressure drop at the low temperature separator. See KFK Report 3196, Kernforschungszentrum Karlsruhe, July, 1981.

In the prior art, the preliminary separating stage continuously returns approximately 70% of the $UF_6$ contained in the extra $H_2$ stream to the head of the isotope separating cascade or to the point where stage sizes change in the isotope separating cascade. The remaining 30% of the $UF_6$ are frozen in the low temperature separators and develop discontinuously during the heating phases employed in the operation of the low temperature separators. The $UF_6$ coming from the low temperature separators must therefore be intermediately stored in a $UF_6$ buffer and fed back in regulated amounts into the isotope separating cascade. At the same time, the "product stream" is obtained at the head of the $UF_6$ separation system. In the ideal state, there is no fluctuation in the buffer influx and no fluctuation in the buffer outflux, and this product stream corresponds precisely to the difference between the buffer influx and the buffer outflux. In the prior art, these buffer streams are greater, by a factor of 50 to 100, than the product stream. Therefore, relatively small fluctuations in these buffer streams, unless they are correlated, lead to relatively great changes in the difference between buffer influx and buffer outflux. This difference represents the stream effectively discharged from the cascade at the cascade head. Due to the large ratio of the buffer streams to the ideal product stream, even small fluctuations in these buffer streams (e.g. 1%), as they can hardly be prevented in practice, already lead to relatively great fluctuations in the ratio between the stream effectively discharged from the cascade and the ideal product stream (e.g. 50 to 100%). Experience has shown that such fluctuations can lead to considerable losses in the average production output of the system because of the isotope mixing connected therewith.

SUMMARY OF THE INVENTION

It is therefore an object of the present invention to provide an improved process for separating light additive gas employed in a separating nozzle cascade operating with a mixture of gaseous or vaporous substances to be separated.

A further object of the present invention is to provide such a process which noticeably reduces, at a justifiable expense, the ratio of buffer influx to product stream or, in certain cases, even to completely eliminate the buffer.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for separating light additive gas at the end of and/or at the location of the change in stage sizes in a separating nozzle cascade operating with a mixture of gaseous or vaporous substances to be separated and a light additive gas, with the separation of the light additive gas being effected by utilizing at least one separating nozzle stage, comprising employing a double deflection separating nozzle stage as the separating nozzle stage for the separation of the light additive gas.

In one preferred embodiment of the present invention, the separating nozzle stage for the separation of the light additive gas is a double deflection separating nozzle stage which serves as a preliminary separating stage and is combined with a low temperature separator.

In another embodiment of the present invention, a gas separating cascade which includes a plurality of series-connected double deflection separating nozzle stages is used for the separation of the light additive gas.

It is further preferred that a partial stream containing the mixture of substances to be separated in the separation of the light additive gas is taken at least at one change of stage size location in the separating nozzle cascade and is fed into a product side of a section of the separating nozzle cascade at that point where the composition of the mixture of substances to be separated in the partial stream and in the separating nozzle cascade section substantially coincides after combination.

Preferably, if the light additive gas is separated with the use of a gas separating cascade comprising a plurality of series-connected double deflection separating nozzle stages, the product stream and/or the partial stream are taken from a heavy fraction of a separating nozzle stage connected downstream of the entrance separating nozzle stage in the gas separating cascade.

It is to be understood that both the foregoing general description and the following detailed description are exemplary and explanatory, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DETAILED DESCRIPTION OF THE INVENTION

Figure 2:
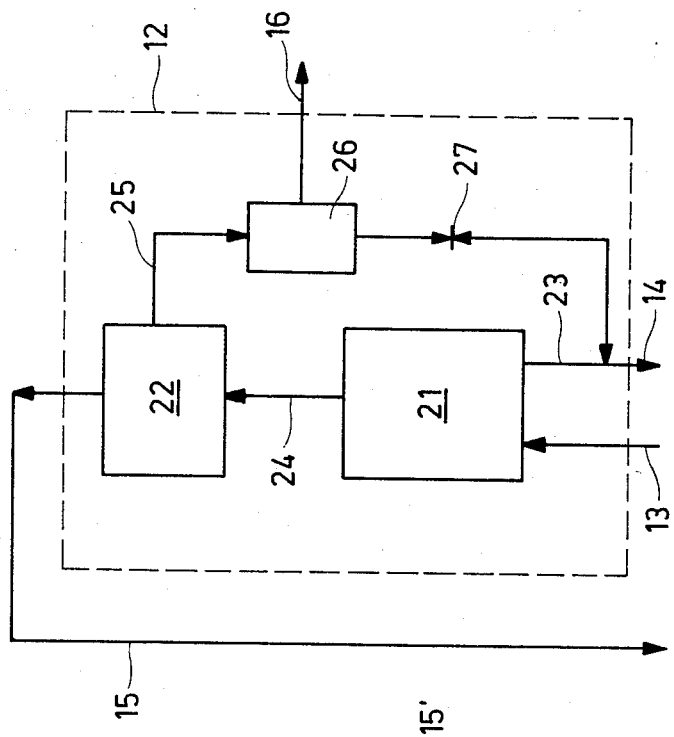
FIG. 2 is a schematic illustration of a UF$_6$ separating system operating with a preliminary separating stage and a low temperature separator.

In the prior art, so-called single deflection separating nozzles, as they are disclosed, for example, in German Patent No. 1,198,328, and corresponding U.S. Pat. No. 3,362,131 have been provided exclusively for the preliminary separating stage as well as for the gas separating cascade. So-called double deflection separating nozzles whose function is disclosed in German Patent No. 2,243,730, and corresponding U.S. Pat. No. 3,877,892 have not yet been considered for this purpose.

In the separation of uranium isotopes, for which the double deflection separating nozzles were designed, it is to be expected that savings in the order of magnitude of 10 to 20% can be realized in specific energy consumption and in component costs. See Z. Naturforschg., 32a, 401–410 (1977). These advantages, however, are counterbalanced in double deflection separating nozzles by noticeably higher separating element costs, with the result that double deflection separation nozzles have not yet been employed in industry. Although double deflection separating nozzles have been seriously considered in published plans for future separating nozzle systems, no proposals have been made in this connection for the use of double deflection separating nozzles for the separation of the light additive gas at the head of the isotope separating cascade and/or between different size stages in the isotope separating cascade.

The present invention is based on the surprising realization that double deflection separating nozzles offer significantly greater advantages, compared to single deflection separating nozzles, for the separation of UF$_6$ and H$_2$ than for the separation of uranium isotopes for which the double deflection separating nozzles were designed.

With the use, according to the present invention, of a double deflection separating nozzle as the preliminary separating stage in combination with a low temperature separator, the ratio of buffer influx to product stream can be reduced, compared to prior art solutions, by about one order of magnitude with only little added expense. The regulating problem in the return feed of UF$_6$ from the buffer and the danger of production losses connected therewith are reduced correspondingly.

By using, according to the present invention, a plurality of series-connected double deflection separating nozzle stages in the form of a gas separating cascade, the UF$_6$ buffer is avoided completely which is the best solution from a regulating point of view. In separating nozzle systems operating with especially small characteristic dimensions of the separating nozzles and a correspondingly high gas pressure, such as disclosed in, for example, German Patent No. 2,922,642 and corresponding U.S. patent application Ser. No. 06/155,652, the use, according to the present invention, of a gas separating cascade composed of double deflection separating nozzle stages, makes it additionally possible to reduce investment and operating costs of the UF$_6$ separating system compared to prior art solutions.

For the separation of light additive gas, this also results in a shift in the isotope frequencies in the separating nozzle stages employed for this purpose, while such an effect does not occur in the low temperature separators. Since with the use, according to the present invention, of double deflection separating nozzle stages, the separation of the light additive gas is taken over to a significantly greater degree or completely by the separating nozzle stages, a UF$_6$ separating system operating according to the process of the present invention furnishes a significantly greater shift in isotope frequency than the prior art arrangement. This effect can be utilized, by means of the following measures to save a not insignificant number of separating nozzle stages in the isotope separating cascade. In particular, a partial stream containing the mixture of substances to be separated in the separation of the light additive gas can be taken at least at one change of stage size location in the separating nozzle cascade, and this partial stream can be fed into a product side of a section of the separating nozzle cascade at the point where the composition of the mixture of substances to be separated in the partial stream and in the cascade section substantially coincides after combination. If the light additive gas is separated with the use of a gas separating cascade comprising a plurality of series-connected double deflection separating nozzle stages, the product stream and/or the partial stream preferably are taken from the heavy fraction of a separating nozzle stage connected downstream of the entrance separating nozzle stage in the gas separating cascade.

The present invention will now be explained in greater detail with the aid of FIGS. 1 through 7.

Figure 1:
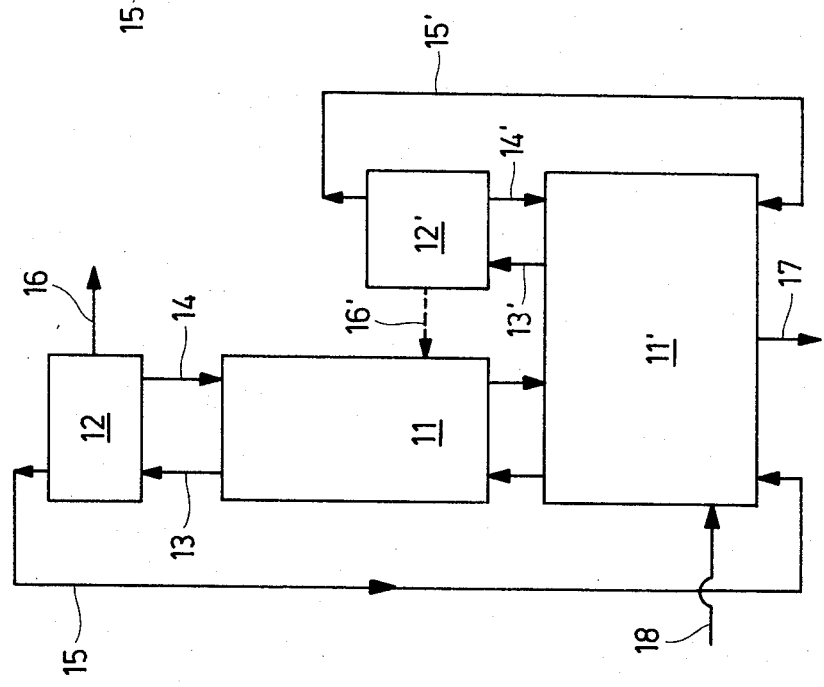
FIG. 1 is a schematic illustration of a separating nozzle cascade operating with two stage sizes.

Referring now to FIG. 1, there is shown a schematic illustration of a separating nozzle cascade operating with two stage sizes, i.e. with one change of stage sizes. The two stage sizes are hereinafter called the "small" and the "large" stage. A so-called small isotope separating cascade 11 comprises a large number of small series-connected separating nozzle stages and thus is comprised of "small" stages. Via a line 13, a first UF$_6$ separating system 12 receives an H$_2$/UF$_6$ mixture coming from the head of small cascade 11. System 12 discharges, via a line 14, a mixture that is highly enriched in UF$_6$ to the head of cascade 11 and, via a line 15, returns practically pure H$_2$ to the foot of a so-called large isotope separating cascade 11'.

A second UF$_6$ separating system 12' receives, via a line 13', the H$_2$/UF$_6$ mixture developed at the head of large cascade 11', i.e. at the change of stages, and not taken over by small cascade 11. Via a line 14', system 12' returns a mixture highly enriched in UF$_6$ to the head of large cascade 11' and via a line 15', returns practically pure H$_2$ to the foot of large cascade 11'. In operation, a stream of a starting material is fed via line 18 to large cascade 11'. A product stream is taken via line 16 from UF$_6$ separating system 12, and a waste stream is taken via line 17 from large cascade 11'.

The schematic illustration of FIG. 2 shows a UF$_6$ separating system operating with a preliminary separating stage and switchable low temperature separator. The separating system can be either that which is employed at the end of the separating nozzle cascade, such as the system 12 of FIG. 1, or that which is employed at the location of the change in stage size of the isotope separating nozzle cascade, such as the system 12' of FIG. 1. The reference numerals shown in FIG. 2 represent system 12 of FIG. 1, but the following description applies equally as well as to system 12', as indicated by the use of the prime reference numerals in the following description.

As can be seen in FIG. 2, the stream of the H$_2$/UF$_6$ mixture coming via lines 13 or 13' from isotope separating cascade 11 or 11', respectively, is divided by a preliminary separating stage 21 into a stream 23 which is enriched with UF$_6$ and a stream 24 which is poor in UF$_6$. A low temperature separator 22 divides stream 24 into practically pure UF$_6$ which is taken from separator 22 via a line 25 and practically pure hydrogen which is taken from separator 22 via a line 15 or 15'. After intermediate storage in a UF$_6$ buffer 26, the UF$_6$ stream from line 25 is combined through a control valve 27, after removal of product stream 16, or optionally after removal of a partial stream 16', with stream 23 to produce a stream 14 or 14'. The thus formed stream 14 or 14', which is rich in UF$_6$, is returned, as shown in FIG. 1, as stream 14 to the head of small isotope cascade 11 and as stream 14' to the head of large isotope cascade 11'. The stream of pure H$_2$ is fed into the foot of the isotope separating cascade 11', as shown in FIG. 1, as stream 15 or 15', respectively. The product stream 16 is obtained from UF$_6$ buffer 26.

Figure 4:
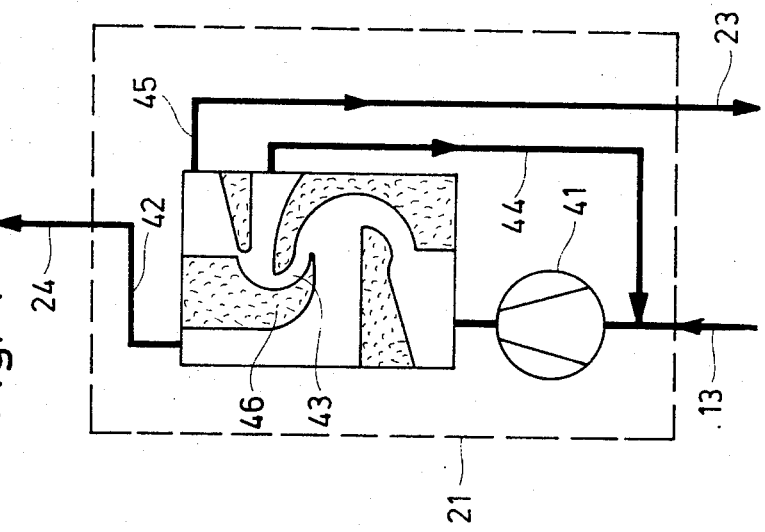
FIG. 4 illustrates a preliminary separating stage operating with a double deflection separating nozzle according to one embodiment of the present invention.
Figure 3:
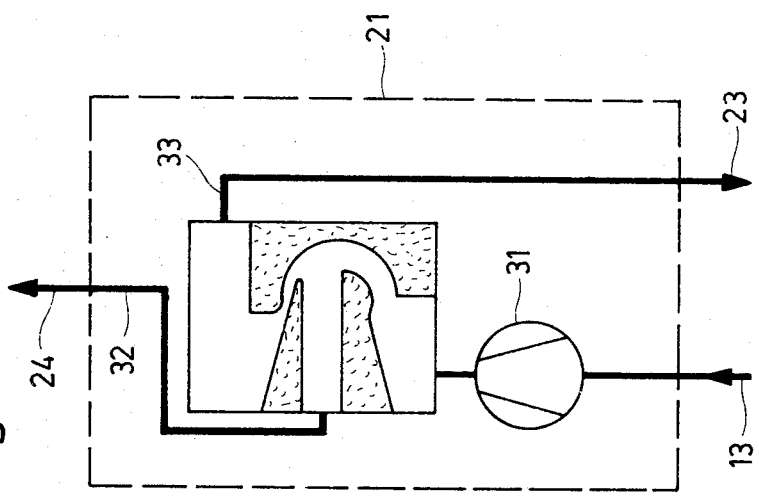
FIG. 3 illustrates a preliminary separating stage operating with a single deflection separating nozzle according to the prior art.

The principles of the preliminary separating stage 21 shown in FIG. 2 and operating with single deflection separating nozzles according to the prior art method or with double deflection separating nozzles according to the present invention are compared in FIGS. 3 and 4. FIGS. 3 and 4 illustrate the embodiment in which stream 13 is treated, but are equally applicable to treating stream 13'.

In FIGS. 3 and 4, the streams 13 or 13' of H$_2$/UF$_6$ mixture coming from the isotope separating cascade are condensed in compressors 31 and 41, respectively, and fed to the separating nozzles. The light fractions 32 and 42, respectively, from the separating nozzles of FIGS. 3 and 4 are conducted out of the stages in both cases and fed as stream 24 to the low temperature separator 22 shown in FIG. 2. The heavy fraction 33 of the single deflection separating nozzle shown in FIG. 3 leaves the stage as a stream 23 enriched in UF$_6$, whereas the heavy fraction 43 of the first nozzle of the double deflection separating nozzle is subjected to renewed separation, producing a medium fraction 44 and a very heavy fraction 45. Fraction 45 leaves the stage as a stream 23 which is very rich in UF$_6$, while fraction 44 is returned within the stage to the suction side of compressor 41.

The specific operating conditions for the double deflection separating nozzle stage can be described as follows:

$$\text{Circulation ratio } Z = \frac{\text{moles in stream 44}}{\text{moles in stream 13 or 13'}}$$

It can be set, inter alia, by the position of deflector 46 of the double deflection separating nozzle.

The gas enrichment factor $\alpha$ is defined by means of the UF$_6$ mole fraction N$_O$ of the gas stream 13 or 13' entering the stage and by the UF$_6$ mole fraction N$_L$ of the gas stream 24 leaving the stage:

$$\text{Gas enrichment factor } \alpha = \frac{N_0(1 - N_L)}{N_L(1 - N_0)}$$

Of additional significance is the additive gas distribution ratio, or the H$_2$ distribution ratio, $\theta_Z$, which is defined as follows:

$$\theta_Z = \frac{\text{moles of additive gas (H}_2\text{) in stream 24}}{\text{moles of additive gas (H}_2\text{) in stream 13 or 13'}}$$

Figure 5:
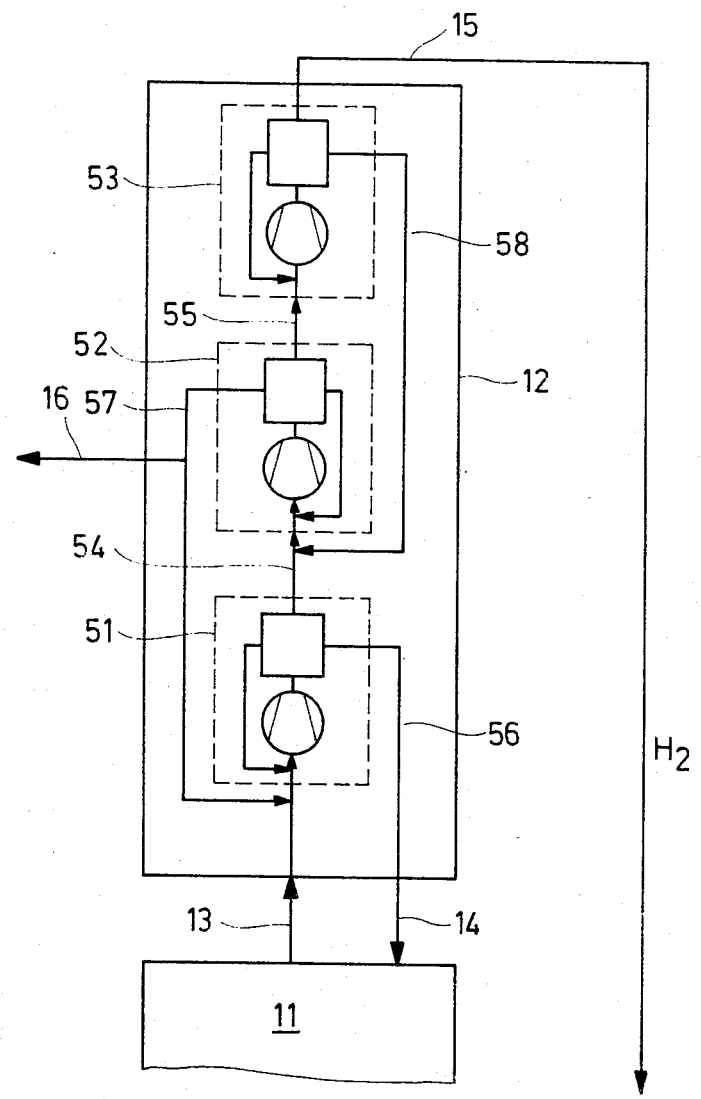
FIG. 5 illustrates a UF$_6$ separation system comprised exclusively of double deflection separating nozzle stages according to another embodiment of the present invention.

The principle of a UF$_6$ separation system, referred to herein as a "gas separating cascade" and comprised, according to the present invention, exclusively of double deflection separating nozzle stages is shown in FIG. 5. In this figure, the numerals 51, 52 and 53 each represent a double deflection separating nozzle stage. The light fraction 24 of the double deflection preliminary separation nozzle stage of FIG. 4 corresponds, in FIG. 5, to the light fractions 54, 55 and 15 of the three series-connected double deflection separating nozzle stages of the gas separating cascade. The heavy fraction 45 of FIG. 4 corresponds, in FIG. 5 to the heavy fractions 56, 57 and 58. The compressor 41 of FIG. 4 and the medium fraction marked 44 in FIG. 4 are shown as such in the double deflection separating nozzle stages of FIG. 5 without special identification.

When the gas separating cascade shown in FIG. 5 is used as a UF$_6$ separating system 12 at the head of cascade 11 (FIG. 1), product stream 16 is advisably extracted, as shown in FIG. 5, from the heavy fraction 57 of the separating nozzle stage 52 connected downstream of the entrance separating nozzle stage 51 in the gas separating cascade. In this way, the enrichment of $^{235}$U is effected, in addition to the gas separation, in the separating nozzle stage 51 without adding an unduly large stream of H$_2$ to the product stream. If the gas separating cascade is comprised of more stages than shown in FIG. 5, it may be advisable to extract the product stream from the heavy fraction of a separating nozzle stage connected downstream of the entrance separating nozzle stage but farther removed therefrom in the gas separating cascade.

When the gas separating cascade of FIG. 5 is used as a UF$_6$ separating system 12' (FIG. 1) at the head of cascade 11', product discharge is generally not provided. However, the enrichment of $^{235}$U can be utilized in this case as well, in that the UF$_6$ containing partial stream 16' (FIG. 1), marked with the numeral 16 in FIG. 5, is fed into the product side of separating nozzle cascade 11 at that location at which the $^{235}$U contents of the UF$_6$ substantially coincide in the partial stream and in cascade 11, after combination.

If the UF$_6$ separating system 12' (FIG. 1) at the head of cascade 11' comprises a combination of preliminary separating stage 21 and low temperature separator 22, as shown in FIG. 2, the enrichment of $^{235}$U effected by the preliminary separating stage can be utilized in a manner analogous to the gas separating cascade.

EXAMPLE 1

In an industrial separating nozzle system presently under construction, the UF$_6$ separating system 12 of FIG. 2 comprises a preliminary separating stage 21 and a low temperature separator 22. The preliminary separating stage is a single deflection separating nozzle stage corresponding to FIG. 3. When the production output of the separating nozzle system is doubled as planned for the future, by increasing pressure, the UF$_6$ influx into the existing low temperature separators is not only not going to be increased, but is to be reduced, if possible, so as to lower the severity of the above-described control problem connected with the feedback of UF$_6$ from buffer 26. This has been accomplished by the present invention by replacing the previously employed single deflection preliminary separating stage with a double deflection preliminary separating stage.

Figure 6:
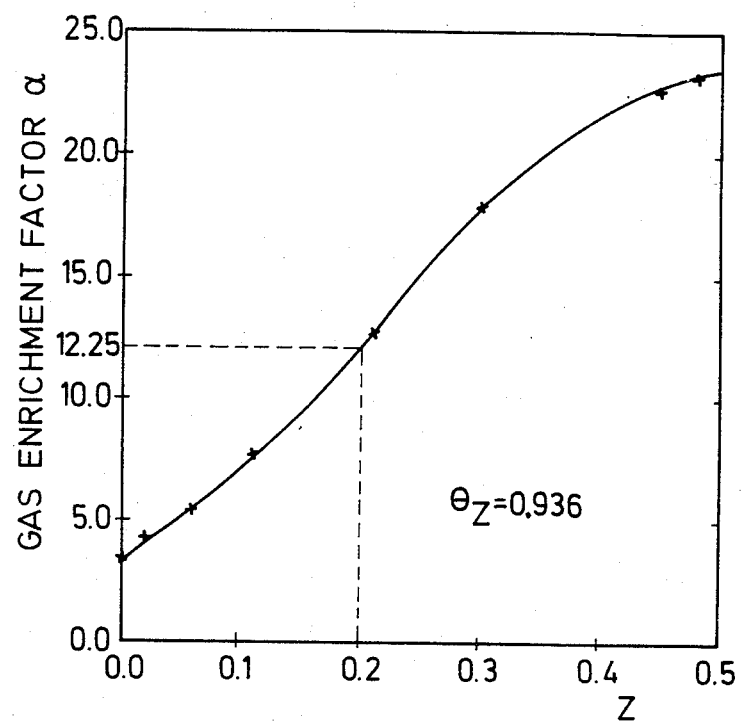
FIG. 6 is a diagram showing a plot of the experimentally determined gas enrichment factors $\alpha$ versus circulation ratio for a system based on FIG. 4.
Figure 7:
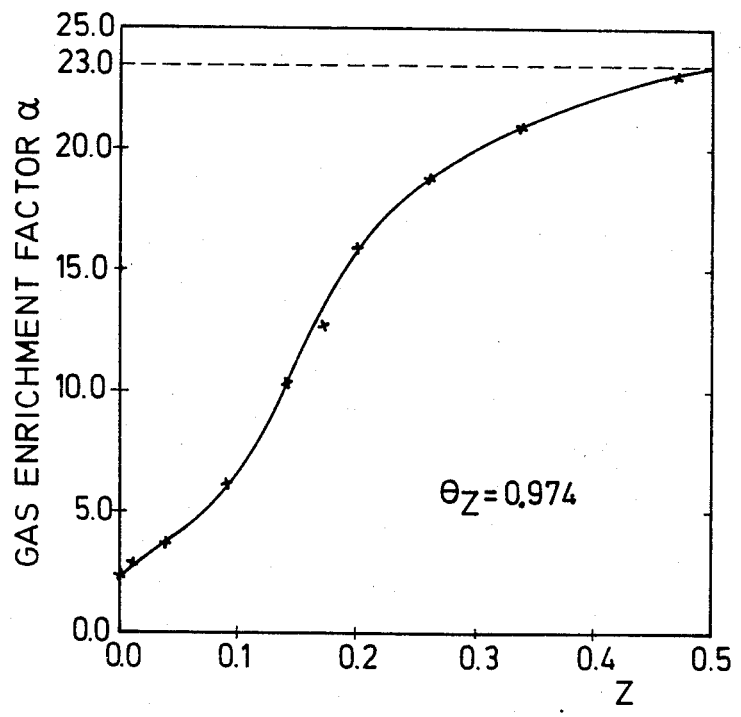
FIG. 7 is a diagram showing a plot of the experimentally determined gas enrichment factors $\alpha$ versus circulation ratio for a system based on FIG. 5.

The surprisingly great improvement in gas separation by changing from single deflection to double deflection separating nozzles can be seen in the present case in FIG. 6 in which the experimentally determined gas enrichment factor $\alpha$ is plotted over the circulation ratio Z. The H$_2$ distribution ratio was here set to meet the requirements of the specific isotope separating cascade 11, i.e. to $\theta_Z = 0.936$. The UF$_6$ mole fraction in the gas stream 13 (FIGS. 3 and 4) was 1.0%, and the expansion ratio present at the nozzles was 2.

FIG. 6 shows that at Z=0, i.e. when the preliminary separating stage is operated with a single deflection separating nozzle according to FIG. 3, a gas enrichment factor $\alpha = 3.5$ is realized under the existing conditions. If two single deflection separating nozzle stages with the same separating factor were connected in series in order to reduce the UF$_6$ stream entering into the low temperature separator, a gas enrichment factor of $3.5^2 = 12.25$ would result.

It can be seen in FIG. 6 that this gas enrichment factor of 12.25 is realized with but a single separating nozzle stage if it is equipped with double deflection separating nozzles according to FIG. 4 and these are operated at a circulation ratio of Z=0.2. Under consideration of the fact that a double deflection separating nozzle stage at Z=0.2 has a compressor throughput higher by 20% and thus also a driving output higher by 20% than a single deflection separating nozzle stage, an energy saving of about 40% results when the gas enrichment factor of 12.25 is realized with a double deflection separating nozzle stage instead of with a single deflection separating nozzle stage. Surprisingly, this saving is twice as high as the maximum energy saving known in the past when double deflection separating nozzle stages were used for the separation of uranium isotopes. See German Patent No. 2,243,730 and corresponding U.S. Pat. No. 3,877,892.

Since, however, a compressor larger by 20% is only about 10% more expensive (in this connection, it has been assumed, as customary in apparatus engineering, that costs increase in proportion with the square root of the size), the use of the double deflection separating nozzles result in savings of investment costs for the compressor including accessories of about 45%.

The required separating element slit length, just as the energy consumption, results in a saving of about 40%. However, in connection with investment costs it must be considered that, due to their more complicated structure, double deflection separating nozzles are more expensive than single deflection separating nozzles. If it is assumed that double deflection separating nozzles cost twice the price per meter of slit length, which seems to be justified pursuant to studies made regarding manufacturing costs for separating elements, there results an added investment of 20% for double deflection separating nozzles.

This drawback of higher investment costs for the separating nozzles is by far overcompensated, however, by the above-described advantages in connection with the investment costs for compressors and the energy saving, so that the use of double deflection separating nozzles to solve the problem at hand results in a noticeable technical and economic advantage.

EXAMPLE 2

In a planned commercial separating nozzle system which will operate with particularly small characteristic dimensions of the separating nozzles and a correspondingly high gas pressure, such as disclosed in German Patent No. 2,922,642 and corresponding U.S. patent application Ser. No. 06/155,652, now U.S. Pat. No. 4,422,905, it would be advisable for control and operational reasons to avoid, if possible, low temperature separators at the head of the cascade and at the change of stage sizes in the isotope separating cascade constructed to comprise two stage sizes.

The gas separating cascades with single deflection separating nozzle stages considered exclusively so far in this connection have been found to be much too complicated in the present case as well. This problem has been solved by the present invention in that gas separating cascades are provided which operate with double deflection separating nozzle stages. The success of this measure will be explained in greater detail below:

The improvement in gas separation by changing from single to double deflection separating nozzles for the present case can be seen in FIG. 7, which again shows the experimentally determined gas enrichment factor $\alpha$ plotted over the circulation ratio Z. The H$_2$ distribution ratio, however, is here set at $\theta_Z=0.974$ to correspond to the higher demands of this commercial system. At Z=0, i.e. for a single deflection separating nozzle according to FIG. 3, the gas enrichment factor, in spite of the fact that the expansion ratio has been increased from 2 to 3 compared to FIG. 6, is now $\alpha=2.35$. With a double deflection separating nozzle according to FIG. 4, however, and with a circulation ratio of Z=0.5, a gas enrichment factor of $\alpha=23$ can be realized.

Since the residual UF$_6$ content of the H$_2$ streams 15 or 15' being fed back into the isotope separating cascade 11' (FIG. 1) is to be less than 1 ppm, while it is approximately 1 Mol% in stream 13 coming from the head of separating cascade 11 and stream 13' coming from the change in stage size location in the isotope separating cascade, the gas separating cascades must furnish a total enrichment factor of $\alpha_G=12,000$. According to the equation $$\alpha_G=\alpha^n,$$

the required number of stages n in a gas separating cascade operating with single deflection separating nozzles is $$n=11.$$

However, when double deflection separating nozzles are used at Z=0.5, because $\alpha=23$, only $$n=3$$

stages are required.

The design of the gas separating cascades corresponds to FIG. 5. In the present case, the UF$_6$ concentration of 1 Mol% in stream 13 is reduced in stage 51 to 0.044 Mol% in stream 54. Stage 52 reduces the UF$_6$ content in stream 55 to 0.001 Mol%. Finally, a final concentration of 0.000082 Mol% UF$_6$ is realized in stream 15 leaving stage 53, and this lies below the required upper limit of 1 ppm UF$_6$.

In a comparison of the energy consumption of gas separating cascades operating with double and single deflection separating nozzles it must considered, in addition to the number of stages, that double deflection separating nozzles stages operating at Z=0.5 have a compressor throughput that is higher by 50%, and therefore a driving power that is higher by 50% as well, than that of single deflection separating nozzle stages. As a whole, the change from single deflection to double deflection separating nozzles in Example 2 results in an energy saving of at least 60%, thus significantly higher yet than in Example 1.

With a circulation ratio of Z=0.5, the volume sucked into the compressors is increased by 50% so that in this case a compressor for double deflection separating nozzle stages becomes approximately 23% more expensive than a compressor for single deflection separating nozzle stages (cost degression assumed to be the same as in Example 1). However, since only three instead of 11 compressors are required here per gas separating cascade, the use of double deflection separating nozzles results in an investment cost saving of 66% for the compressor including accessories.

If it is assumed as in Example 1 that the price per meter of separating nozzle slit for double deflection separating nozzles is double that of single deflection separating nozzles, there results a saving in the present case as well in the investment costs for the separating nozzles, and it amounts to approximately 18%.

As evidenced by a comparison of costs, the saving of more than 50% in energy costs and in the sum of investment costs for a gas separating cascade when a change is made from single deflection to double deflection separating nozzles makes the gas separating cascade of the present case which operates with double deflection separating nozzle stages, not only technically but also economically superior to the prior art solution.

When the gas separating cascade considered in Example 2 is used as a UF$_6$ separating system 12 at the head of small isotope separating cascade 11 shown in FIG. 1, the product stream 16 is taken, according to the present invention, as shown in FIG. 5, from the heavy fraction 57 of the center separating nozzle stage 52. If, for example a $^{235}$U concentration of 3.000% is prescribed for the product stream 16, the entrance stream 13 need have only a $^{235}$U concentration of 2.867%. By utilizing the $^{235}$U enrichment according to the present invention in the gas separating cascade, approximately five separating nozzle stages in the small isotope separating cascade 11 can be left out in this case.

That no unduly high stream of H$_2$ is mixed in with the product stream 16 extracted in this manner, can be determined as follows:

Under optimum conditions, the UF$_6$ stream contained in stream 16 is seventy times smaller than the UF$_6$ stream entering the UF$_6$ separating system together with the gas stream 13. Since the UF$_6$ mole fraction in stream 16, moreover, is greater by the factor 1.6 than that in stream 13, it follows that less than 1/100 of the H$_2$ stream entering into the gas separating cascade is discharged together with stream 16. This relatively small H$_2$ stream can be separated from the UF$_6$ product stream at little expense by means of a low temperature separator and can be fed back into the isotope separating cascade.

When the gas separating cascade considered in Example 2 is used as a UF$_6$ separating system 12' at the head of the large isotope separating cascade 11' (FIG. 1), i.e. at the change of stage sizes, the stream marked 16 in FIG. 5 is introduced as partial stream 16' into the product side cascade section, i.e. into the small isotope separating cascade 11 (FIG. 1) while circumventing nine separating nozzle stages following the change of stage sizes. As shown by the calculation, the utilization according to the present invention of the $^{235}$U enrichment in the gas separating cascade eliminates the need for five further stages in the small isotope separating cascade 11 at the change of stage size location. A separation of the H$_2$ from stream 16' is not necessary since the H$_2$ stream in 16' is only a few percent of the H$_2$ stream in the small isotope separating cascade 11.

It will be understood that the above description of the present invention is susceptible to various modifications, changes and adaptations, and the same are intended to be comprehended within the meaning and range of equivalents of the appended claims.

What is claimed is:

1. Process for separating light additive gas at the end of and/or at the location of the change of stage sizes in a separating nozzle cascade operating with a mixture of gaseous or vaporous substances to be separated and a light additive gas, with the separation of the light additive gas being effected by utilizing at least one separating nozzle stage, comprising employing a double deflection separating nozzle stage as the separating nozzle stage for the separation of the light additive gas, wherein the mixture of substances to be separated in the separation of the light additive gas is taken at least at one change of stage size location in the separating nozzle cascade, is separated by the double deflection nozzle into a first partial stream deriched in the light additive gas and a second partial stream enriched in the light additive gas, and the first partial stream is fed into a product side of a section of the separating nozzle cascade at that point where the composition in the first partial stream with respect to the substances to be separated in the separating nozzle cascade and the composition in the separating nozzle cascade section substantially coincide after combination.

2. Process as defined in claim 1, wherein the separating nozzle stage for the separation of the light additive gas is a double deflection separating nozzle stage which serves as a preliminary separating stage and is combined with a low temperature separator.

3. Process as defined in claim 1, wherein a gas separating cascade comprising a plurality of series-connected double deflection separating nozzle stages is used for the separation of the light additive gas.

4. Process as defined in claim 3, wherein the gas separating cascade comprises an entrance separating nozzle stage and at least one separating nozzle stage connected downstream of the entrance separating nozzle stage, and a product stream is taken from a heavy fraction of a separating nozzle stage connected downstream of the entrance separating nozzle stage in the gas separating cascade.

5. Process as defined in claim 1, wherein the mixture of substances to be separated in the separation of the light additive gas and taken at the change of stage size location is separated with the use of a gas separating cascade comprising a plurality of series-connected double deflection separating nozzle stages including an entrance separating nozzle stage and at least one separating nozzle stage connected downstream of the entrance separating nozzle stage, and the partial stream is taken from a heavy fraction of a separating nozzle stage connected downstream of the entrance separating nozzle stage in the gas separating cascade.

6. In a process having an isotope separating cascade for separating a mixture of isotopes and employing light additive gas, and wherein the light additive gas is separated at the end of the isotope separating cascade and/or at the location of the change of stage sizes in the isotope separating cascade, the isotope separating cascade operating with a mixture of gaseous or vaporous isotope substances to be separated and a light additive gas, with the separation of the light additive gas being effected by utilizing at least one separating nozzle stage, comprising employing a double deflection separating nozzle stage as the separating nozzle stage for the separation of the light additive gas, wherein the mixture of substances to be separated in the separation of the light additive gas is taken at least at one change of stage size location in the isotope separating cascade, is separated by the double deflection apparatus into a first partial stream deriched in the light additive gas and a second partial stream enriched in the light additive gas, and the first partial stream is fed into a product side of a section of the isotope separating cascade at that point where the composition of the mixture of isotopes in the first partial stream and in the isotope separating nozzle cascade section substantially coincide after combination.

7. Process as defined in claim 6, wherein the separating nozzle stage for the separation of the light additive gas is a double deflection separating nozzle stage which serves as a preliminary separating stage and is combined with a low temperature separator.

8. Process as defined in claim 6, wherein a gas separating cascade comprising a plurality of series-connected double deflection separating nozzle stages is used for the separation of the light additive gas.

9. Process as defined in claim 8, wherein the gas separating cascade comprises an entrance separating nozzle stage and at least one separating nozzle stage, and a product stream is taken from a heavy fraction of a separating nozzle stage connected downstream of the entrance separating nozzle stage in the gas separating cascade.

10. Process as defined in claim 6, wherein the mixture of substances to be separated in the separation of the light additive gas and taken at the change of stage size location is separated with the use of a gas separating cascade comprising a plurality of series-connected double deflection separating nozzle stages including an entrance separating nozzle stage and at least one separating nozzle stage connected downstream of the entrance separating nozzle stage, and the first partial stream is taken from a heavy fraction of a separating nozzle stage connected downstream of the entrance separating nozzle stage in the gas separating cascade.

* * * * *